June 3, 1952   G. R. MORRIS   2,599,193
HAND SCRAPING TOOL
Filed April 12, 1949   2 SHEETS—SHEET 2

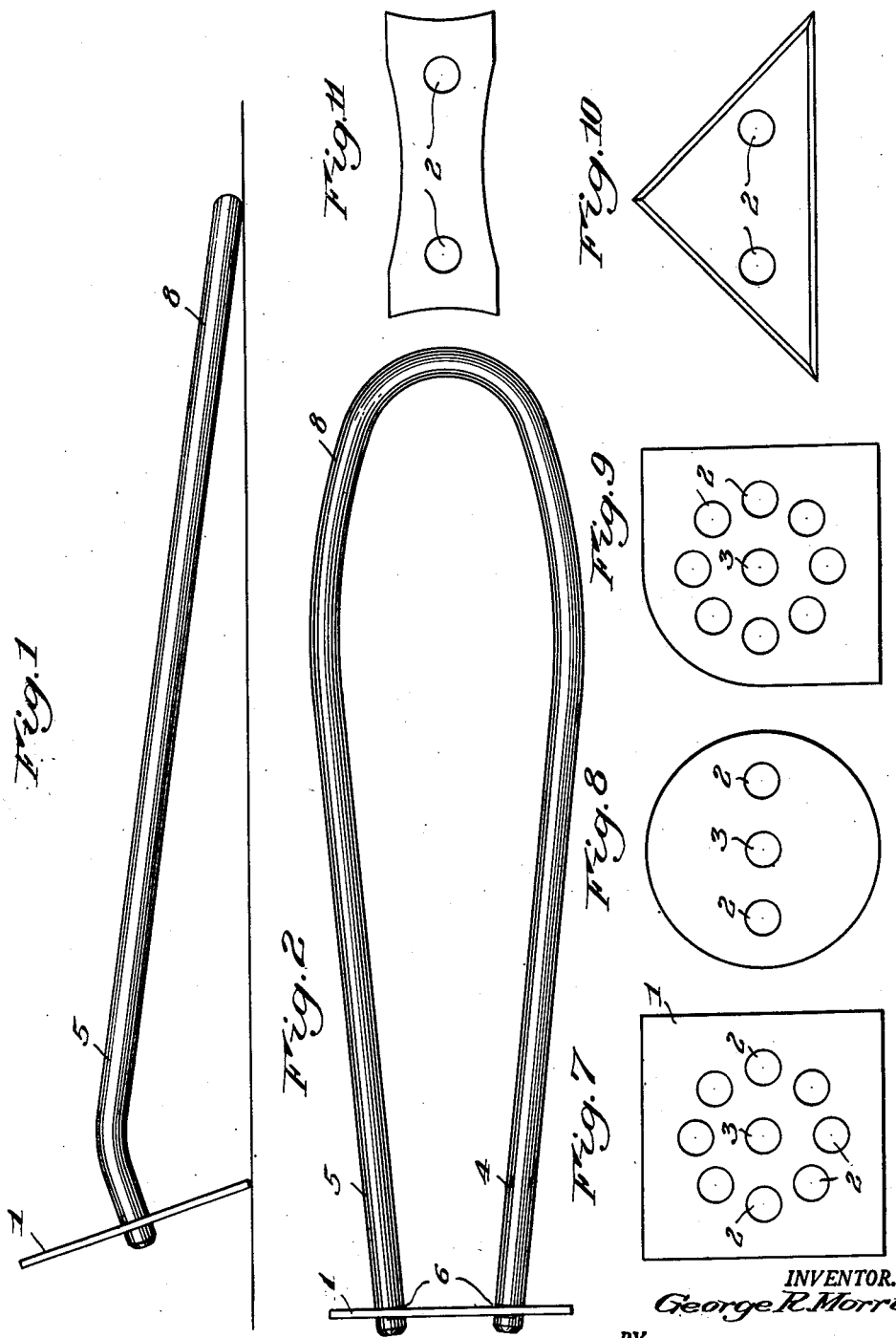

INVENTOR.
George R. Morris
BY
Harold E. Stonebraker,
his Attorney

Patented June 3, 1952

2,599,193

UNITED STATES PATENT OFFICE 2,599,193

HAND SCRAPING TOOL

George R. Morris, Rochester, N. Y.; Mabel H. Morris, administratrix of said George R. Morris, deceased, assignor to Harold E. Stonebraker, Rochester, N. Y.

Application April 12, 1949, Serial No. 86,994

1 Claim. (Cl. 30—169)

This invention relates to a hand scraping tool and has for its purpose to afford an efficient and practical device of economical construction that can easily be operated for scraping surfaces of various contours.

More particularly the invention has for its purpose to afford a detachable handle that is quickly attachable to a scraping blade and can be instantly assembled in operative relation thereto.

Another purpose is to afford a scraper in the form of a thin blade of any desired contour, provided with openings for securely attaching a handle which is held by its spring action to the blade without any fastening means such as nuts or screws, permitting reversing the blades and operating by either pushing or pulling the scraper blade.

A further purpose of the invention is to afford a handle that can be attached quickly to any selected scraper blade and which requires no fastening devices, but is held solely by the cooperative engagement between the scraper blade and handle, permitting the use of blades with either straight or hollow ground edges held at a convenient angle to the scraped surface, and avoiding the necessity of cleaning the scraper blade as where provided with an overlying throat or projection on which scrapings accumulate.

An additional object of the invention is to afford a scraper blade and detachable handle so constructed and related that when secured together, the handle is automatically held tightly and rigidly in the desired relationship to the blade and the pressure applied on the handle by the operator when gripping it acts to hold the scraper blade more tightly, as increasing gripping pressure is applied to the handle.

Still a further object of the invention is to provide a detachable U-shaped one-piece wire handle comprising a pair of spring acting arms characterized by a tendency to move toward each other when in gripping relation with the scraper blade, and constructing the blade and handle in such fashion as to effect a firm gripping action between the handle and blade that increases in gripping effect as the spring arms of the handle are pressed toward each other.

To these and other ends, the invention consists in the construction and arrangement of parts that will appear clearly from the following description when read in conjunction with the accompanying drawings, the novel features being pointed out in the claim following the specification.

In the drawings:

Fig. 1 is a view in side elevation of a hand scraping tool constructed in accordance with a preferred embodiment of the invention;

Fig. 2 is a plan view of the same;

Figure 3:
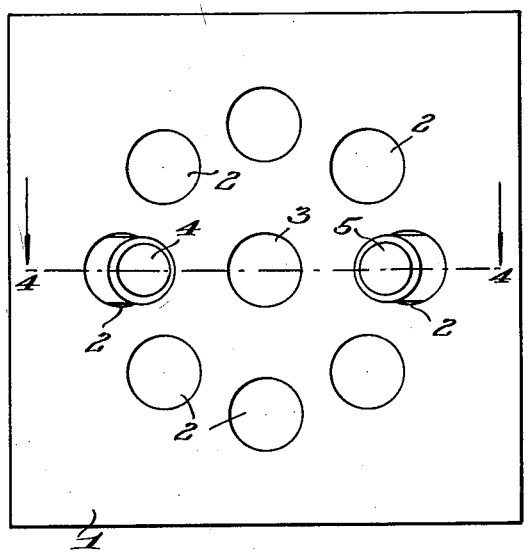
Fig. 3 is a view in end elevation.
Figure 5:
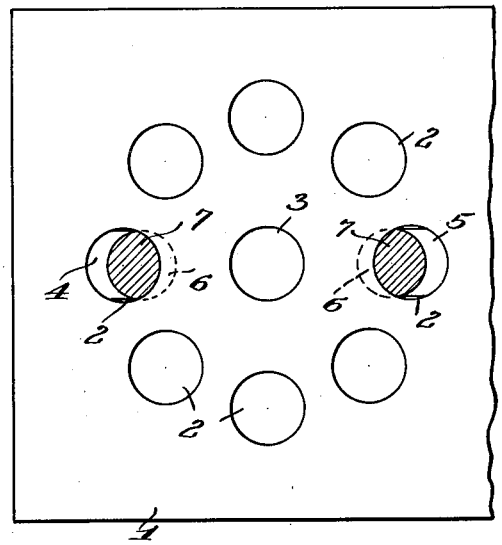
Fig. 5 is a transverse sectional view of the parts shown in Fig. 4 taken in a plane adjacent to the scraper blade.

Referring more particularly to the drawings in which like reference numerals refer to the same parts throughout the several views, 1 designates a scraper blade of square contour with a straight scraping edge along each of its four sides, the scraping edge which may be ground in any preferred manner being preferably perpendicular to the plane of the blade, while 2 designates a series of preferably circular openings which are arranged around the plate 1 as shown for cooperation with a detachable handle in the manner that will presently be described, and 3 is a central opening used for centering the blade when grinding its edges.

The openings 2 are arranged so that any pair of opposite openings can receive two arms of a detachable handle, the openings being disposed so that the handle can be positioned for cooperation with openings at opposite corners of the blade or at opposite sides thereof, and are slightly larger in area than the cross-section of the arms of the handle to permit the latter to be inserted through the openings in the scraper blade.

Figure 4:
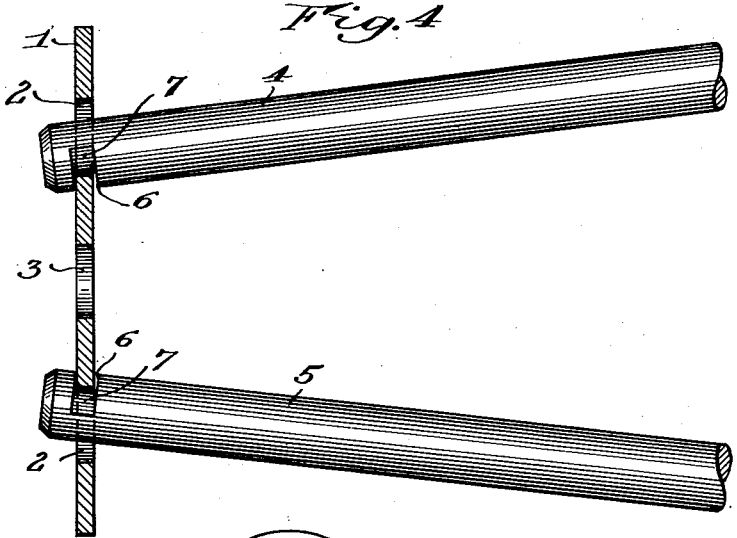
Fig. 4 is a sectional view on line 4—4 of Fig. 3.
Figure 6:
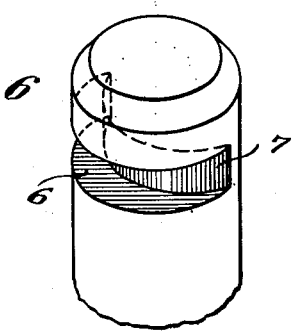
Fig. 6 is an enlarged detail perspective view of the extremity of one of the spring arms of the handle which interlocks with the scraper blade, and Figs. 7 to 11 inclusive are views in elevation of different possible types of scraper blades that can be used with the handle forming part of the invention.

The handle 8 which is preferably of U-shaped one-piece construction is formed of heavy wire of cylindrical cross-section bent on itself to afford two oppositely arranged converging spring arms 4 and 5 which are yieldable relatively toward and from each other due to the inherent spring tendency of the wire forming the handle, and the relationship between the arms is such that when the handle is free from a scraper blade and the arms released, they assume a position in relation to each other about one-third closer than as shown in Fig. 4, where they are engaged with a scraper blade, and in order to secure the handle to a scraper blade, the arms 4 and 5 must be manually moved apart against their spring action until their ends coincide with and can be inserted through opposite openings 2 of the scraper blade.

The arms of the handle are so constructed that when their free ends are inserted through a pair of openings in a scraper blade and released, they interlock with the scraper blade and retain the latter in firm rigid relationship on the handle, and to effect this, the periphery of each arm of the handle is recessed or slotted near its end transversely to afford opposite parallel surfaces 6 which extend transversely of the arm and are perpendicular to the longitudinal axis of the arm at the point where the recess is cut and a convex surface 7 at the base of the recess, the curvature of which conforms generally to the curve of the edge of the scraper blade around the opening 2. The outside diameter or cross-section of each of the arms 4 and 5 is somewhat less than the area of the openings 2 to permit insertion of the arms through the openings 2 and the convexity of surface 7 is approximately that of the edge of the opening 2 so that the convex surface 7 fits closely against the adjacent edge of the blade surrounding the opening.

The width of the recess or the distance between the parallel surfaces 6 is slightly greater than the thickness of the scraper blade so that when the arms 4 and 5, which are in converging relationship as shown in Fig. 2, are inserted through the openings 2 and released, the recesses in the arms assume such positions that the surfaces 6 are inclined to the adjacent surfaces of the scraper blade which they contact, as shown in Fig. 4, and thus the opposite parallel surfaces 6 of each recess engage or bite angularly against opposite surfaces of the scraper blade while the convex surface 7 engages tightly against the edge of the blade surrounding the opening 2. In this fashion the spring arms, by their inherent spring action toward each other, tightly and rigidly grip the scraper blade and prevent any slight play or movement of the scraper blade in relation to the handle. When the handle is gripped by the operator engaging the spring arms 4 and 5 and pressing them toward each other, the scraper blade is held even more tightly, depending upon the degree of pressure exerted when gripping the handle in scraping any particular surface, although the handle is firmly engaged with the scraper blade even without the necessity of manually forcing the arms together.

The spring arms 4 and 5 are preferably bent at points adjacent to their ends, as indicated in Fig. 1, in a direction transversely of the plane of the arms or of the body portion of the handle, so that when the handle is gripped to move a scraper blade across a surface being treated, the blade can be held at an acute angle to the surface over which it travels, as indicated in Fig. 1, to permit the surface to be engaged by a sharp corner of the edge of the scraper blade, or by reversing the handle and scraper vertically, the blade can be held in a position perpendicular to the scraped surface.

With a blade such as illustrated in Fig. 7, any pair of opposite openings can be employed to receive the arms of the handle so that any one of the four edges of the scraper or any corner thereof can be used for scraping a given surface, and if a curved surface is to be scraped, a blade of the form shown in Fig. 8 can be employed requiring two opposite openings. Fig. 9 shows another form of scraper blade where it is desirable to have one corner of the blade rounded, Fig. 10 shows the invention as applied to a triangular shaped blade, and Fig. 11 shows still another form of scraper blade in which the opposite edges are of concave formation for engagement with correspondingly curved surfaces on the work.

While the invention has been described with relation to the particular construction shown herein, it is not confined to the details illustrated, and this application is intended to cover such modifications or departures as may come within the scope of the invention and of the following claim.

I claim:

The combination with a scraper blade having a plurality of circular openings extending therethrough, of a detachable U-shaped one-piece wire handle comprising a pair of arms of cylindrical cross-section extending in a general direction transversely of the blade and of less cross-section than the area of said openings, said arms being movable toward and from each other in a plane and converging toward the blade in the same plane in which they are movable and having transverse blade-engaging peripheral recesses on their inner faces, each of said recesses being defined by opposite parallel surfaces that are perpendicular to the longitudinal axis of the arm and inclined to the adjacent surfaces of the blade, said parallel surfaces in one arm being inclined to the surfaces of the blade in a direction opposite to the corresponding surfaces in the other arm and engaging on an angle with the adjacent surfaces of the blade, said arms being actuated by the inherent spring action of the wire handle toward each other and toward the adjacent edge of the blade whereby the opposite parallel surfaces of the recesses grip opposite surfaces of the blade at the inner and outer portions of the recesses respectively.

GEORGE R. MORRIS.

REFERENCES CITED

The following references are of record in the file of this patent:

UNITED STATES PATENTS

| Number | Name | Date |
|---|---|---|
| 666,633 | Farmer | Jan. 22, 1901 |
| 891,871 | Smith | June 30, 1908 |
| 1,095,617 | Armitage | May 5, 1914 |
| 1,223,238 | Battige | Apr. 17, 1917 |
| 1,264,350 | Unsinger | Apr. 30, 1918 |
| 1,558,021 | Libi | Oct. 20, 1925 |
| 1,995,959 | Blum | Mar. 26, 1935 |
| 2,059,429 | Anderson | Nov. 3, 1936 |